UNITED STATES PATENT OFFICE 2,276,203

CONDENSATION OF ALLYL HALIDES AND SUBSTITUTED ALLYL HALIDES

Morris Selig Kharasch, Chicago, Ill., assignor to E. I. du Pont de Nemours & Company, Wilmington, Del., a corporation of Delaware No Drawing. Application August 29, 1939, Serial No. 292,500

10 Claims. (Cl. 260—648)

This invention relates to the production of intermediates suitable for use in the preparation of valuable synthetic drying oils and resins. More particularly, the invention relates to the reaction of halogenated unsaturated compounds with alkali and alkali earth metal amides to form conjugated products.

Hexatriene and its polymers are known compounds but have been heretofore prepared by processes which were difficult to carry out, and using raw materials which were comparatively rare. For example, Van Romburgh, Van Dorssen, Perkin, Baly, and Tuck described the compound 1,3,5-hexatriene prepared from divinyl ethylene glycol formate. They state that hexatriene is easily polymerized and that it absorbs oxygen. (See J. Chem. Soc. (London) 90, I, 130; J. Chem. Soc. (London) 91, 814; J. Chem. Soc. (London) 93, 1909.) Also Cornubert describes the reaction of allyl iodide with cyclohexanone employing sodamide as condensing agent. The product from condensation contained appreciable amounts of uncharacterized material of probable polymeric nature. (Annal. Chemie (9) 16, 145 Zentralblatt 1921 III 1159). Farmer and others describe the preparation of hexatriene and the preparation of octatriene-2,4,6 from glycols. Polymerization properties of the conjugated olefines are disclosed. (J. Chem. Sov. (London) 1927, 2937–58, Berichte 60, 656; Bull. Soc. Chim. France (4) 43, 996–1018.)

It is an object of this invention to provide a simple and efficient method for the preparation of highly unsaturated compounds containing conjugated systems. A further object of the invention is to prepare such unsaturated compounds from allyl halides and substituted allyl halides. A still further object is the preparation of new chemical compounds. Other objects will appear hereinafter.

These objects are accomplished by the present invention which consists in reacting allyl halides and substituted allyl halides with alkali metal and alkaline earth metal amides. This reaction is preferably carried out in the presence of liquid ammonia and produces trienes, polymers thereof, and further condensation products of the trienes with the starting halides. Graphically presented the preparation of the monomeric derivatives and the further condensation products of the trienes with the olefine halides may be represented as follows:

(1)

$$R'-CH=C-CH_2X + XCH_2-C=CH-R' + 2NaNH_2 \xrightarrow{NH_3}$$
$$\phantom{R'-CH=C-CH_2X + XCH_2-C=}R\phantom{X+XCH_2-C=}R$$

$$R'-CH=C-CH=CH-C=CH-R' + 2NaX + 2NH_3$$
$$\phantom{R'-CH=}R\phantom{=CH=CH=}R$$

(2)

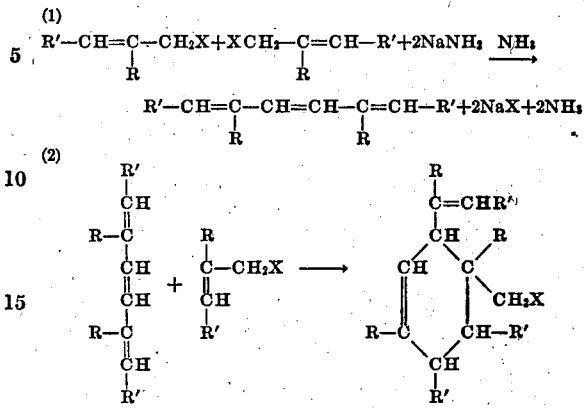

In these formulae, X represents halogen, R and R' represent halogen, hydrogen, hydrocarbon, substituted hydrocarbon and carboxyester radicals.

In order that the process may be more fully understood, the following specific examples are given. Such examples are merely by way of illustration and the invention is not limited thereto, but suitable variations may be made as will become more apparent hereinafter.

EXAMPLE I

*Hexatriene and dimer (butadienyl vinyl cyclohexene)*

Dissolve 0.5 part of ferric nitrate in 372 parts of liquid ammonia, 23 parts of sodium (1 atom), then add in small portions as rapidly as solution occurs. Add the sodamide suspension while stirring to 76 parts (1 mole) of allyl chloride ($CH_2=CH-CH_2Cl$) and 620 parts of liquid ammonia. The addition of sodamide suspension must be carefully regulated so that the reaction does not become too violent. When complete, evaporate the ammonia, add water to dissolve the sodium chloride, and extract the mixture with ether. After evaporation of ether, fractional distillation yields two main fractions as follows:

(1) Hexatriene-1,3,5

$$(CH_2=CH-CH=CH-CH=CH_2),$$

B. P.=76–80° C. at 760 mm.; $N^{20}_D$=1.4330. (2) Dimer of hexatriene (butadienyl-vinyl-cyclohexene)

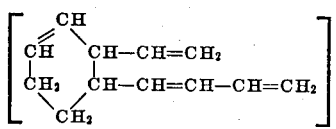

B. P.=50–55° C./3 mm. $n^{20}_D$=1.5137.

The constants for the hexatriene correspond with those recorded by Farmer, Larola, Switz and Thorpe, J. C. S. 1927, 2949. The dimer of hexatriene is believed to be butadienyl vinyl cyclohexene as indicated because (a) hydrogenation yields a saturated compound, 1-butyl-2-ethyl-cyclohexane, B. P.=208° C., $n^{20}_D$=1.4493 which corresponds to material synthesized from alpha-ethyl-cyclohexanone and butyl magnesium bromide (Signaigo and Cramer, J. A. C. S. 55, 3326 (1933)) and (b) because the dimer reacts with maleic anhydride to give a well defined crystalline derivative indicating the presence of a conjugated system.

*Example II*

*Hexatriene dimer, trimer and tetramer*

Increasing yields of dimer, along with trimer and tetramer are obtained by reaction of allyl chloride and sodamide as follows: Add 100 parts of allyl chloride (1.33 moles) to a solution of 78 parts sodamide (2 moles) in 1240 parts of liquid ammonia and stir for 30–45 minutes. Procedure as in Example I and distillation of the ether free product in a molecular still gave fractions as follows:

| Name of principal product | B.P./10⁻⁴mm. | $n^{20}_D$ | Analysis | |
|---|---|---|---|---|
| | | | Found | Calculated |
| | °C | | | For $C_{12}H_{18}$ |
| (1) Dimer | 20–35 | 1.5137 | % C 89.2<br>% H 9.75<br>M. W. 174<br>Double bonds 4 (by hydrogenation) | 89.92<br>10.08<br>160<br>4 |
| | | | | For $C_{18}H_{24}$ |
| (2) Trimer | 70–80 | 1.5232 | % C 89.27<br>% H 9.84<br>M. W. 227<br>Double bonds 5 | 89.92<br>10.08<br>240<br>5 |
| | | | | For $C_{24}H_{32}$ |
| (3) Tetramer | 120–133 | 1.5330 | % C 88.98<br>% H 9.72<br>M. W. 341<br>Double bonds 6 | 89.92<br>10.08<br>320<br>6 |

EXAMPLE III

*Chloro-methyl-vinyl-cyclohexene*

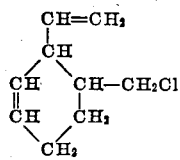

The nature of the higher boiling material obtained by the reaction of allyl chloride with sodamide in liquid ammonia is dependent upon the experimental conditions. When three moles of allyl chloride are dissolved in liquid ammonia and two moles of sodamide are added the main product is 1-chloro-methyl-2-vinyl cyclohexene-3.

Add 40 pts. of sodamide over a period of 1½ hours to 100 pts. of allyl chloride in liquid ammonia. Treatment as described in Example I yields (1) hexatriene, and (2) chloro-methyl-vinyl-cyclohexene, B. P. 44–48° C./8 mm., $n^{20}_D$=1.4670

Analysis: Calc. for $C_9H_{13}Cl$, Cl 22.66 M. W. 156.45; found, Cl 22.91 M. W. 156.

Hydrogenation yields the known 1,2-ethyl-methyl-cyclohexane, B. P. 156° C. $n^{20}_D$=1.4412.

EXAMPLE IV

Allyl bromide, $CH_2=CH-CH_2Br$, when reacted with sodamide in anhydrous ammonia as described in Examples I, II, and III gives results similar to those shown for allyl chloride.

EXAMPLE V

*2,5-dimethyl-hexatriene-1,3,5*

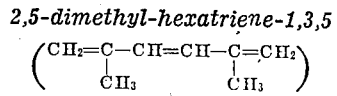

Methallyl chloride,

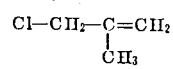

reacted with sodamide under conditions as described in Example I yields 2,5-dimethyl-hexatriene-1,3,5. This product polymerizes faster than hexatriene-1,3,5. To isolate momer, it is necessary therefore to work up the reaction product immediately after being produced.

EXAMPLE VI

*1,6-dimethyl-hexatriene-1,3,5—*
$CH_3—CH=CH—CH=CH—CH=CH—CH_3$

This product is obtained by reacting crotyl chloride, $CH_3CH=CH—CH_2Cl$, with sodamide as described for allyl chloride in Example I.

EXAMPLE VII

*1,6-diphenyl-hexatriene-1,3,5—*

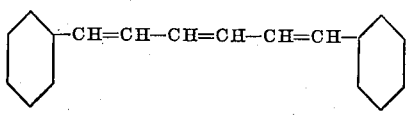

Cinnamyl chloride,

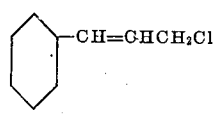

reacted with sodamide in liquid ammonia as described in Example I yields monomeric 1,6-diphenyl-hexatriene-1,3,5.

EXAMPLE VIII 1,4-dichloro-butene-2 or 1,4-dibromo-butene-2

(XCH$_2$CH=CH—CH$_2$X) reacted as described in Example I forms a highly unsaturated straight chain polymer of high molecular weight.

EXAMPLE IX 2,3-Dichloro-propene-1,

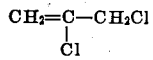

reacted with sodamide as described above forms a polymeric body believed to have the following structural formula:

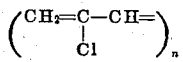

EXAMPLE X

*1,6-dicarbethoxy-hexatriene-1,3,5—*
C$_2$H$_5$O$_2$CCH=CH—CH=CH—CH=CH—CO$_2$C$_2$H$_5$
1-Carbethoxy-3-chloro-propene,

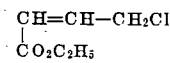

reacted with sodamide as described yields as principal product monomeric 1,6-dicarbethoxy-hexatriene-1,3,5.

The halogenated unsaturated compounds with which this invention is concerned are those containing the nucleus

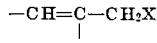

wherein X is halogen.

The preferred embodiment of the invention includes those halogenated unsaturated compounds corresponding to the formula:

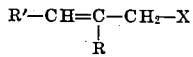

wherein X is halogen, R is a member of the group consisting of hydrogen, halogen, alkyl radicals, and carboxylic ester radicals, R' is a member of the group consisting of hydrogen, halogen, alkyl radicals, aromatic radicals, and carboxylic ester radicals, and wherein both R and R' contain less than 13 carbon atoms and both R and R' may be halogen substituted. Still more specifically preferred are allyl halides and methallyl halides. Wherever halogen is used in this specification and appended claims, it means a member of the group consisting of chlorine, bromine, iodine, and fluorine. Chlorine is the preferred halogen.

The amides suitable for the practice of this invention are those of the class consisting of alkali metal and alkaline earth metal amides, such as, for example, potassium, lithium, calcium, struntium and barium amides. The preferred amide is sodamide.

The process of the invention is preferably carried out in the presence of sufficient liquid ammonia to dissolve at least a portion of the reactants. The quantity of ammonia present may be varied within wide limits. The use of large quantities of liquid ammonia has the advantage that it tends to modify the violence of the reaction. On the other hand, it is desirable not to use too large an amount of ammonia for economic reasons. It is also possible to decrease the violence of the reaction by the addition of inert solvents such as benzene, xylene, petroleum ether, tetralin, etc. to the reaction mass.

The reaction proceeds well at atmospheric pressure, but it may be desirable to carry out the reaction under superatmospheric conditions in order to reduce ammonia losses and in order to perform the reaction at temperatures above the boiling point of liquid ammonia. In so far as has been ascertained, there are no critical temperature limits. The course of the reaction may be directed to produce different proportions of products by varying the reaction conditions. Thus, for example, when sodamide is added to allyl chloride in equimolecular proportions, a good yield of hexatriene is obtained. Whereas when allyl chloride is added to twice its equivalent of sodamide, the yield of hexatriene is lower and there is obtained a proportionally greater amount of higher boiling materials. It should be clearly understood, however, that regardless of the order in which the reactants are added to each other and regardless of the proportions used, the process is operative to produce conjugated products. After the reaction has been completed the products may be isolated by any convenient process known in the art, as for example, fractional distillation, extraction with solvents or a combination of both methods as disclosed in Example I of this specification.

The invention described processes and conditions for the preparation of trienes and their polymers and the condensation of trienes with halogenated unsaturated compounds. The lower trienes and their derivatives made according to the present process have been heretofore made by more complicated methods and from rare and inaccessible raw materials. These products are produced according to the present invention from readily available raw materials and by means of a reaction that proceeds readily under a wide range of conditions. The invention accordingly represents an economical and advantageous method of producing such trienes and polymers. The condensation products of trienes with halogenated unsaturated compounds produced according to the present invention are new compounds having valuable characteristics as is hereinafter set forth.

The trienes, triene polymers, and halogen condensation products thereof produced according to the present invention are polymerizable compounds. These materials also absorb atmospheric oxygen to produce oxidized resin-like products. Accordingly they are useful in the field of synthetic drying oils and resins. By their use, films may be produced which possess good resistance to chemical corrosion, light, abrasion and moisture. Accordingly they find application in the paint, varnish, waterproofing and protective coating, safety glass, and textile and leather printing arts.

It is apparent that widely different embodiments of this invention may be made without departing from the spirit and scope thereof, and therefore it is not intended to be limited except as indicated in the appended claims.

I claim:

1. Process which comprises condensing with itself a compound of the formula

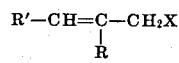

wherein X is halogen, R is a radical of the group consisting of hydrogen, halogen, and alkyl, and R' is a radical selected from the group consisting of hydrogen, alkyl, halogen substituted alkyl, aryl, and carboxy ester, and wherein both R and R' contain less than 13 carbon atoms, by reacting it with an amide of the class of alkali metal and alkaline earth metal amides in the presence of liquid ammonia.

2. Process which comprises condensing with itself a compound of the formula

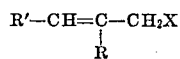

wherein X is halogen, R is a radical of the group consisting of hydrogen, halogen, and alkyl, and R' is a radical selected from the group consisting of hydrogen, alkyl, halogen substituted alkyl, aryl, and carboxy ester and wherein both R and R' contain less than 13 carbon atoms, by reacting it with sodamide in the presence of liquid ammonia.

3. Process which comprises reacting allyl halide with sodamide.

4. Process which comprises reacting allyl halide with sodamide in liquid ammonia.

5. Process for producing hexatriene and hexatriene polymers which comprises slowly adding allyl chloride to sodamide in liquid ammonia until the reactants are present in the molecular proportions of allyl chloride to sodamide equal to substantially 1.3 to 2.

6. Process for producing chloro-methyl-vinyl-cyclo hexene which comprises slowly adding sodamide to allyl chloride in liquid ammonia until the reactants are present in the molecular proportions of sodamide to allyl chloride equal to substantially 2 to 3.

7. Process which comprises reacting methallyl halide with sodamide.

8. Process which comprises reacting methallyl halide with sodamide in liquid ammonia.

9. A compound of the formula

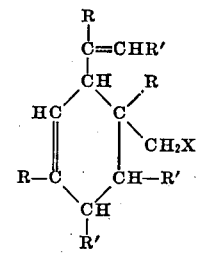

wherein X is halogen, R is a radical of the group consisting of hydrogen, halogen, and alkyl, R' is a radical of the group consisting of hydrogen, alkyl, halogen substituted alkyl, aryl, and carboxy ester, and wherein both R and R' contain less than 13 carbons atoms.

10. A compound of the formula $$\begin{array}{c} H \\ | \\ C=CH_2 \\ | \\ CH \\ HC \diagup \quad \diagdown CH-CH_2Cl \\ \| \qquad \qquad | \\ HC \diagdown \quad \diagup CH_2 \\ CH_2 \end{array}$$

MORRIS SELIG KHARASCH.